(12) United States Patent
Gibson et al.

(10) Patent No.: US 9,140,177 B2
(45) Date of Patent: Sep. 22, 2015

(54) DUAL FUEL COMMON RAIL ENGINE WITH CO-AXIAL QUILL ASSEMBLY

(75) Inventors: Dennis Henderson Gibson, Chillicothe, IL (US); Shivangini Singh Hazari, Peoria, IL (US); Dana Ray Coldren, Secor, IL (US); Daniel Raymond Baldwin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 622 days.

(21) Appl. No.: 13/492,974

(22) Filed: Jun. 11, 2012

(65) Prior Publication Data

US 2013/0327296 A1   Dec. 12, 2013

(51) Int. Cl.
| | |
|---|---|
| *F02M 55/02* | (2006.01) |
| *F02B 3/06* | (2006.01) |
| *F02M 45/00* | (2006.01) |
| *F02M 55/04* | (2006.01) |
| *F02B 43/00* | (2006.01) |
| *F02M 21/02* | (2006.01) |
| *F02D 19/06* | (2006.01) |
| *F02M 63/02* | (2006.01) |
| *F02M 43/04* | (2006.01) |
| *F02M 45/08* | (2006.01) |
| *F02M 37/00* | (2006.01) |

(52) U.S. Cl.
CPC . *F02B 3/06* (2013.01); *F02B 43/00* (2013.01); *F02D 19/0647* (2013.01); *F02D 19/0684* (2013.01); *F02D 19/0694* (2013.01); *F02M 21/0287* (2013.01); *F02M 43/04* (2013.01); *F02M 45/00* (2013.01); *F02M 45/086* (2013.01); *F02M 55/02* (2013.01); *F02M 55/025* (2013.01); *F02M 55/04* (2013.01); *F02M 63/029* (2013.01); *F02M 37/0017* (2013.01); *F02M 2200/856* (2013.01); *Y02T 10/32* (2013.01); *Y02T 10/36* (2013.01)

(58) Field of Classification Search
CPC ............ F02M 37/0017; F02M 55/004; F02M 55/005; F02M 55/02; F02M 55/025; F02M 69/46; F02M 69/462; F02M 69/52; F02M 2200/16; F02M 2200/856
USPC .............. 285/121.1, 123.1, 123.3; 138/26, 30
See application file for complete search history.

(56) References Cited

U.S. PATENT DOCUMENTS

| | | | |
|---|---|---|---|
| 2,881,826 | A | 4/1959 | Spies, Jr. |
| 3,053,312 | A | 9/1962 | Villoresi |
| 4,311,277 | A | 1/1982 | Stratton |
| 5,560,546 | A | 10/1996 | Goulet et al. |
| 5,884,846 | A | 3/1999 | Tan |
| 6,270,024 | B1 | 8/2001 | Popp |
| 6,336,598 | B1 | 1/2002 | Touchette et al. |
| 7,000,403 | B2 | 2/2006 | Henriquez et al. |
| 7,104,069 | B2 | 9/2006 | Martling et al. |
| 7,373,931 | B2 | 5/2008 | Lennox et al. |
| 7,438,238 | B2 | 10/2008 | Date et al. |
| 8,272,368 | B2 * | 9/2012 | Wickstone .................... 123/468 |
| 8,683,979 | B2 * | 4/2014 | Kim et al. .................... 123/456 |
| 8,726,884 | B2 * | 5/2014 | Hackett ........................ 123/456 |

(Continued)

*Primary Examiner* — Erick Solis
*Assistant Examiner* — Anthony L Bacon

(57) ABSTRACT

A dual fuel common rail engine supplies pressurized natural gas and liquid diesel fuel at different pressures through a co-axial quill assembly for direct injection from a single fuel injector into an engine cylinder. Pressure waves in the gaseous fuel common rail are damped in a pressure damping chamber of the co-axial quill assembly before the pressure wave can undermine consistent gaseous fuel injection rates and quantities from the fuel injector.

7 Claims, 5 Drawing Sheets

(56) References Cited

U.S. PATENT DOCUMENTS

| | | |
|---|---|---|
| 2011/0108004 A1 | 5/2011 | Wickstone |
| 2011/0214643 A1 | 9/2011 | Blizard et al. |
| 2012/0055448 A1* | 3/2012 | Kim et al. .................... 123/456 |
| 2012/0285419 A1* | 11/2012 | Hackett et al. ............... 123/304 |

* cited by examiner

DUAL FUEL COMMON RAIL ENGINE WITH CO-AXIAL QUILL ASSEMBLY

TECHNICAL FIELD

The present disclosure relates generally to dual fuel common rail engines, and more particularly to a co-axial quill assembly with a gas pressure damping chamber.

BACKGROUND

Natural gas is increasingly becoming an attractive fuel source option for internal combustion engine applications. One type of natural gas engine ignites a main charge of natural gas in an engine cylinder by compression igniting a pilot quantity of diesel fuel. Although a variety of strategies exist for supplying both gaseous and liquid fuels in a compression ignition engine, newer generation engines have tended toward the advantages associated with common rail fuel systems. Additional problems and challenges can be added when there is a desire to adapt a dual fuel system to pre-existing engine geometry platform. An example dual fuel common rail system is shown, in U.S. Pat. No. 7,373,931.

The present disclosure is directed toward one or more of the problems set forth above.

SUMMARY

In one aspect, a dual fuel engine includes an engine housing that defines a plurality of cylinders. A dual fuel common rail system includes exactly one fuel injector positioned for direct injection in each of the plurality of engine cylinders. The system also includes a gaseous fuel common rail and a liquid fuel common rail that are fluidly connected to each fuel injector, and the system further includes a co-axial quill assembly with inner and outer tubes in sealing contact with a common conical seat of each fuel injector. The inner tube is out of contact with the outer tube for each co-axial quill assembly. A pressure damping chamber defined by each co-axial quill assembly damps pressure waves moving from the gaseous fuel common rail toward the respective fuel injector. The pressure damping chamber has a volume greater than a gaseous fuel volume within the respective fuel injector.

In another aspect, a co-axial quill assembly for a dual fuel common rail fuel system includes a block that defines a liquid fuel passage that opens into a quill chamber through a conical seat, and also defines a gaseous fuel passage that opens into the quill chamber outside of the conical seat. An inner tube defines a liquid fuel conduit extending between a second end and a first end with an annual spherical surface resting in contact with, but unattached to, the conical seat of the block. An outer tube has a hollow interior separating a second end from a first end that is received in the quill chamber. A gaseous fuel conduit extends between an outer surface of the inner tube and an inner surface of the outer tube. An annular seal prevents gaseous fuel from escaping from the gaseous fuel conduit between the block and the outer tube. An upstream half of the gaseous fuel conduit has a pressure damping chamber with a volume larger than a volume of a downstream half of the gaseous fuel conduit to damp pressure waves arriving from the gaseous fuel passage of the block. A gage line at the second end of the inner tube extends a predetermined target distance beyond a gage line at the second end of the outer tube so that the inner and outer tubes seat on a common conical seat responsive to a predetermined load on the block along an axis of the inner tube.

In still another aspect, a method of operating a dual fuel engine includes assembling a dual fuel common rail fuel system to an engine housing. Gaseous fuel is supplied from a gaseous fuel common rail to each one of the plurality of fuel injectors through a respective co-axial quill assembly. Liquid fuel from a liquid fuel common rail is also supplied to each one of the plurality of fuel injectors through the respective co-axial quill assembly. Gaseous fuel is injected from a fuel injector into an engine cylinder responsive to a gaseous fuel injection signal. Likewise, liquid fuel from the fuel injector is injected into the engine cylinder responsive to a liquid fuel injection signal. Variations in the gaseous fuel injection quantities among the plurality of fuel injectors is reduced by damping pressure waves arriving from the gaseous fuel common rail with a pressure damping chamber defined by the respective co-axial quill assemblies.

DETAILED DESCRIPTION

Figure 1:
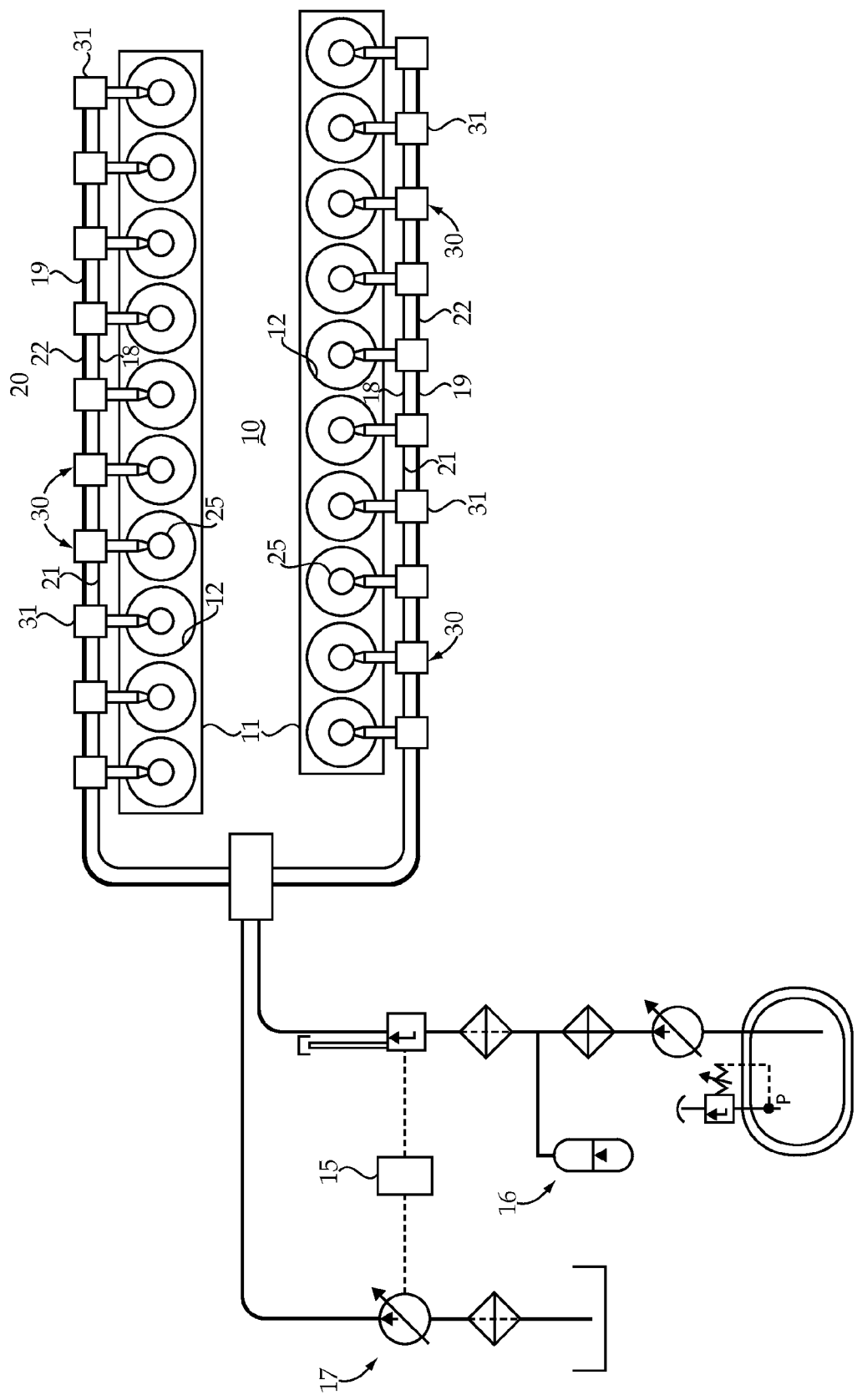
FIG. 1 is a schematic view of a dual fuel engine according to the present disclosure.
Figure 2:
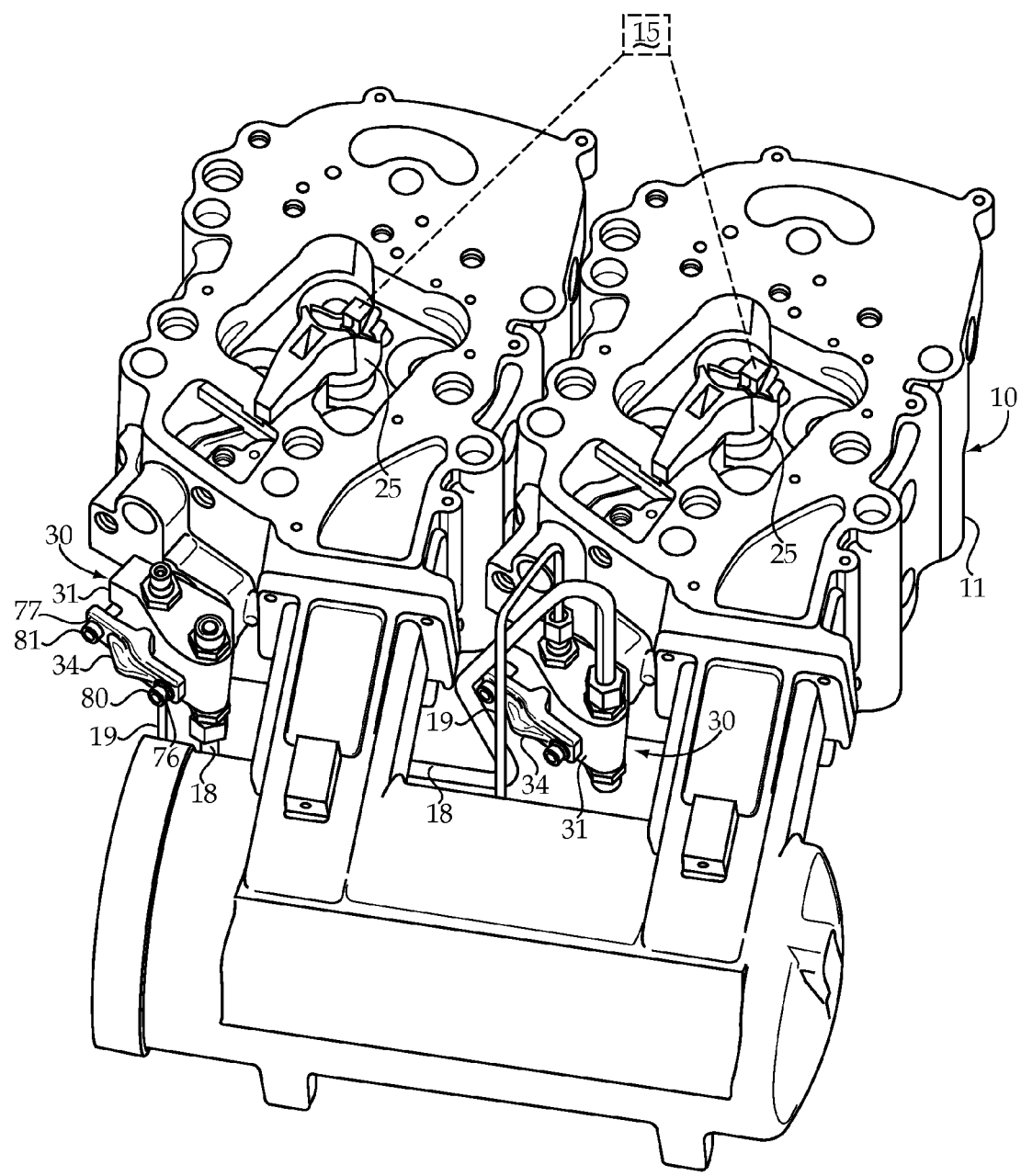
FIG. 2 is a perspective view of a portion of the engine and dual fuel common rail system for the engine of FIG. 1.
Figure 3:
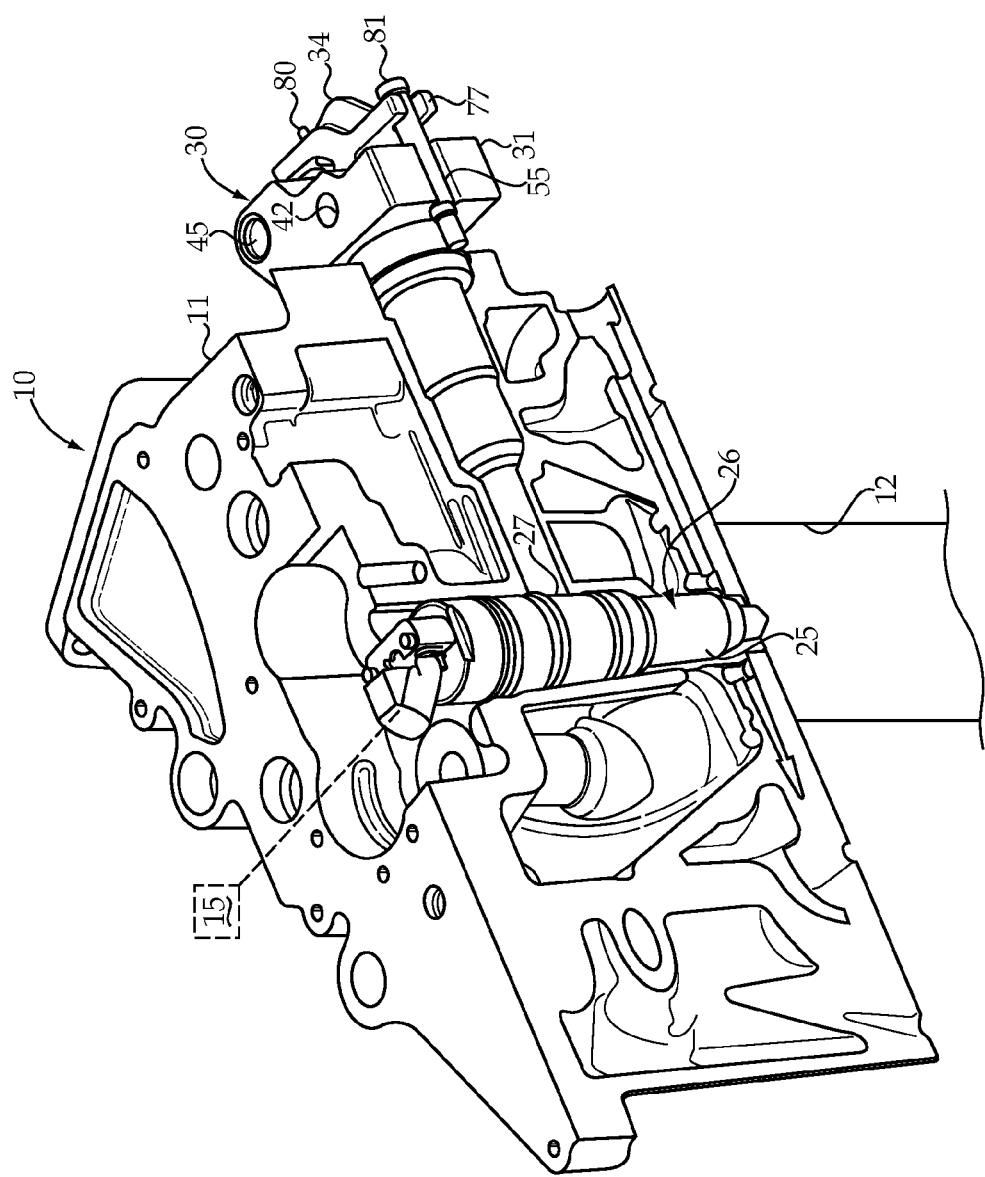
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are controlled by an electronic engine controller 15 in a known manner. The gas supply and pressure control devices 16 may include a pressurized cryogenic liquid natural gas tank with an outlet fluidly connected to a variable delivery cryogenic pump. Devices 16 may also include a heat exchanger, an accumulator, a gas filter and a vented fuel conditioning module that controls the supply and pressure of gaseous fuel to gaseous fuel common rail 21. The liquid supply and pressure control devices 17 may include a diesel fuel tank, fuel filters and an electronically controlled high pressure fuel pump that supply liquid fuel to, and control pressure in, liquid fuel common rail 22.

As best shown in FIGS. 1 and 2, the blocks 31 of the co-axial quill assemblies 30 are daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2.

Figure 4:
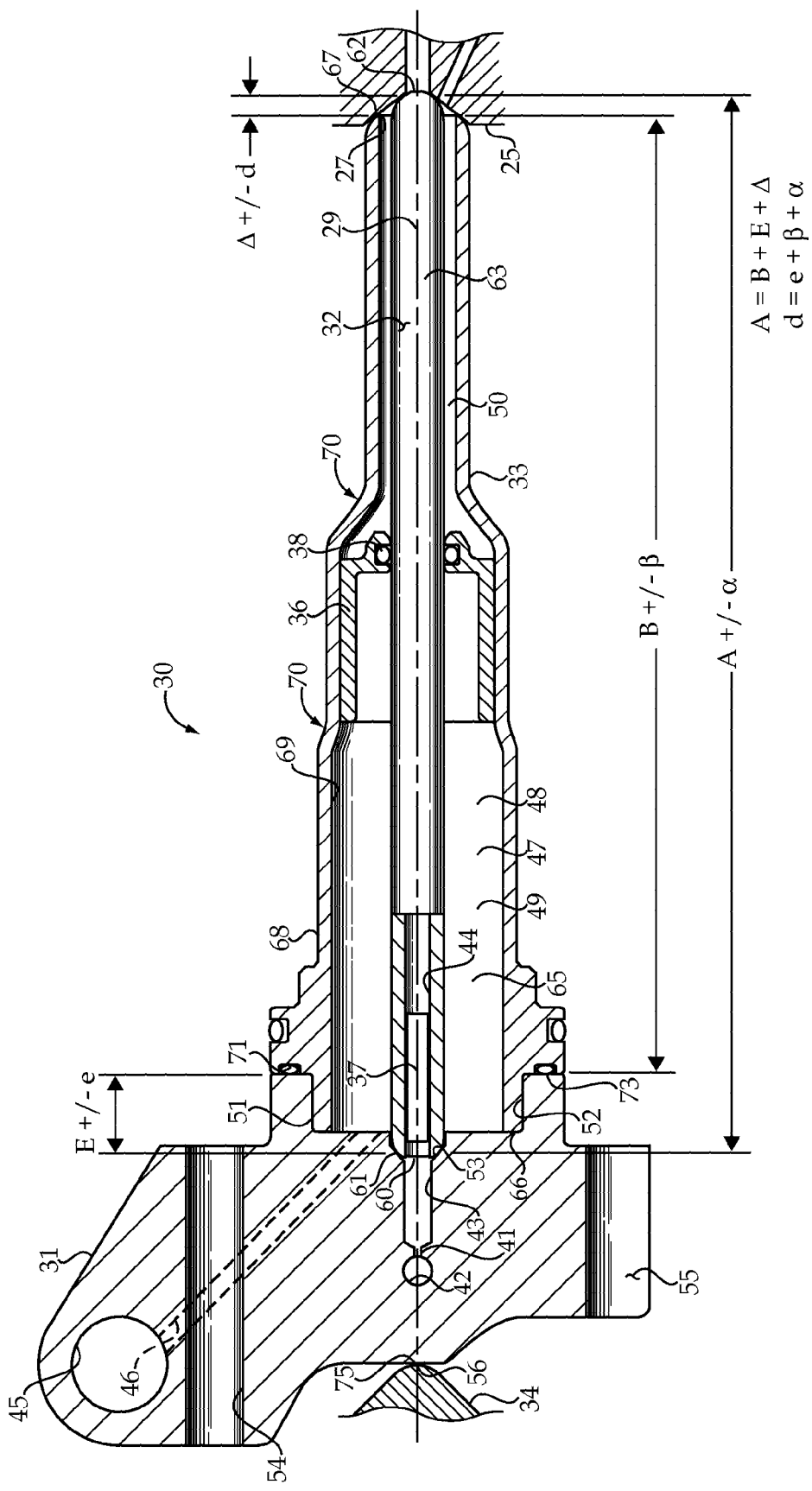
FIG. 4 is a sectioned side view through a co-axial quill assembly according to another aspect of the present disclosure.

Referring in addition to FIG. 4, the dual fuel common rail system 20 also includes a co-axial quill assembly 30 with an inner tube 32 and an outer tube 33 in sealing contact with a common conical seat 27 of each fuel injector 25. In the illustrated embodiment, a pressure damping chamber 48 consists of an upstream segment 49 of the gaseous fuel conduit 47 that has a flow area at least several times larger than the downstream segment 50 of the gaseous fuel conduit 47. The pressure damping chamber 48 is defined in each co-axial quill assembly 30 in order to damp pressure waves moving from gaseous fuel common rail 21 toward the respective fuel injector 25, especially during an injection event. The pressure damping chamber 48 has a volume greater than a gaseous fuel volume 26 (nozzle chamber, sac and gas passageways) within the respective fuel injector 25. Those skilled in the art will appreciate that the available space constraints on fuel injector 25 limit the size of the gaseous fuel volume 26 within each fuel injector 25. The gas volume 26 in each fuel injector may likely be many times less than a rated gaseous injection volume from injector 25.

Figure 7:
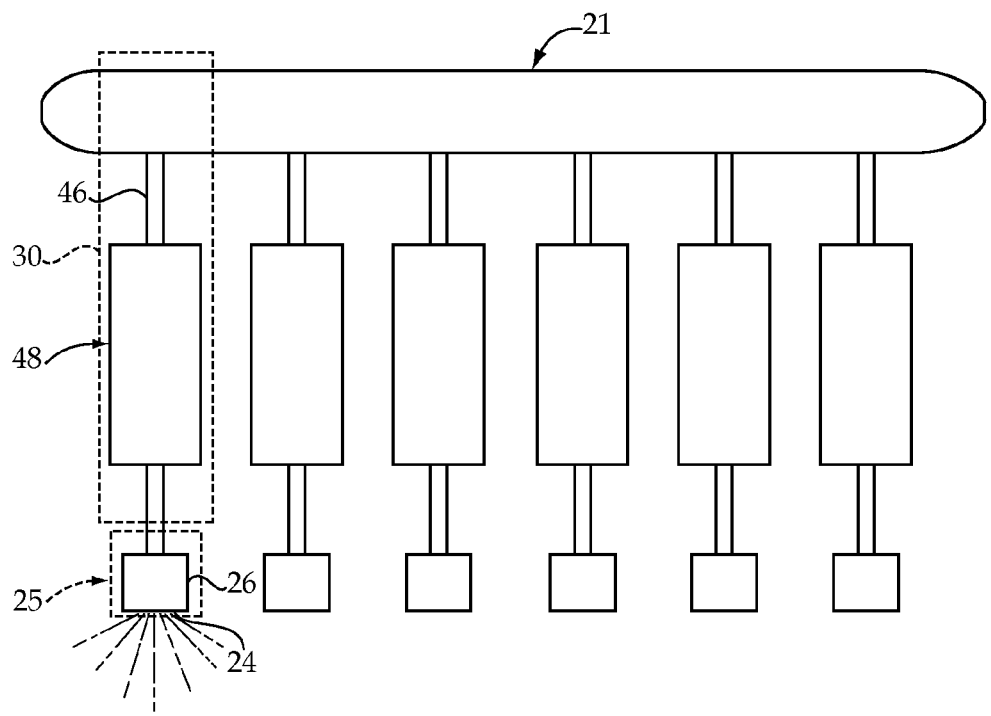
FIG. 7 is a volume schematic of a gaseous portion of the common rail fuel system for the engine of FIG. 1.

One strategy for sizing the pressure damping chamber 48 may start with the continuity equation, and then derive an equation for the pressure response of a particular fluid (e.g. natural gas) in a specific volume (the pressure damping chamber 48) to a flow rate arriving (from the rail 21) to a flow rate leaving the volume (injection rate). The idea is to reduce the pressure change reaction to the volume flow of the fluid to a satisfactory level. The pressure damping chamber 48 should provide sufficient absorbtion of arriving pressure waves to damp out reflective transients. Thus, one might consider a maximum rated volume of gaseous fuel delivery for fuel injector 25 in the engine 10, and the gas injection pressure, and size a volume of the pressure damping chamber that will provide sufficient absorbtion of the pressure waves. FIG. 7 shows the relative volumes of the gaseous fuel common rail 21, the pressure damping chamber 48 and the injector gas volume 26 for the illustrated engine 10.

Referring again to FIGS. 2-4, each co-axial quill assembly 30 may include a load adjusting clamp 34 with a pivot surface 75 in contact with a block 31 at a load adjustment location 56 that is intersected by the axis 29 of the inner tube 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. Fastener 80 may include a spherical washer and bolt, while fastener 81 may be a shoulder bolt that is utilized to set an attitude of load adjustment clamp 34. For instance, the proper assembly may require connection of co-axial quill assembly 30 to engine housing 11 with first fastener 81. Bolt 80 can then be tightened to a pre-determined torque that assures proper seating seal contact between outer tube 33 and inner tube 32, independently but simultaneously, on common conical seat 27 of fuel injector 25. During this process, load adjustment clamp 34 will pivot through some limited small angle. The fasteners 80 and 81 are received in fastener bore 54 and fastener slot 55, respectively of blocks 31.

Each block 31 of each co-axial quill assembly 30 defines a gaseous rail passage 45 that is oriented perpendicular to the axis 29 of inner tube 32 and fluidly connected to a gaseous fuel passage 46 that opens at one end into a quill chamber 52 outside of conical seat 53. The gaseous rail passage 45 may extend completely through block 31 in order to facilitate the daisy chain connection structure shown in FIGS. 1 and 2. Each block 31 also includes a liquid rail passage 42, which may extend all the way through, and that is oriented perpendicular to the axis 29 and fluidly connected to a liquid fuel passage 43 that opens on one end into quill chamber 52 through conical seat 53. A segment of liquid fuel passage 43 may have an orifice segment 41, as shown, to reduce a flow rate from the liquid rail 22 to help manage transients in the liquid quill 32. The minimum area required for the orifice 41 may be computed by dividing the total injection quantity by the injection duration, and sizing the orifice to allow that delivery with a minimum pressure drop. Thus, the sizing of that flow area may relate to the performance characteristics of fuel injector 25. The inner tube 32 defines a liquid fuel conduit 44 extending between a first end 60 and a second end 62. First end 60 includes an annular spherical surface 61 that rests in contact at a gage line with the conical seat 53, and a gage line on an annular spherical surface at second end 62 in contact with common conical seat 27 of fuel injector 25. The outer tube 33 has a hollow interior 65 separating a first end 66 from a second end 67. The first end 66 is received in the quill chamber 52, and the outer tube 33 may be attached to block 31 with mating threads 51.

Practical manufacturing limitations may forbid mass production of co-axial quill assemblies 30 in which either the inner tube 32 or the outer tube 33 are integrally formed with block 31. Thus, an annular seal 71 serves to seal against leakage of gaseous fuel from between block 31 and outer tube 33 of co-axial quill assembly 30. In this embodiment, annular seal 71 includes an o-ring 73 in a face seal configuration trapped between block 31 and outer tube 33. In the illustrated construction, the inner tube 32 is out of contact with the outer tube 33 in each co-axial quill assembly 30. A gaseous fuel conduit 47 is fluidly connected to gaseous fuel passage 46, and also extends between outer surface 63 of inner tube 32 and the inner surface 69 of outer tube 33. Spatial constraints in engine housing 11 may require that an upstream half 49 of the gaseous fuel conduit 47 have a pressure damping chamber 48 with a volume larger than a volume of a downstream half 50 of the gaseous fuel conduit 47. Thus, a majority of the volume of the pressure damping chamber 48 may be located in an upstream half 49 of the gaseous fuel conduit 47 both within outer tube 33 and within quill chamber 52. As stated earlier, the pressure damping chamber 48 should be of sufficient size and shape to damp pressure waves arriving from the gaseous fuel passage 46 in order to reduce variations in gaseous fuel injection rates and quantities. In this specific example, the available space in engine housing 11 may permit the relatively uniform wall thickness of the outer tube 33, which is defined between an inner surface 69 and outer surface 68, to include two step wise diameter reductions 70 along the axis 29 in a direction of second end 67. Nevertheless, other engine housing geometries may vary substantially from that shown. The gaseous rail passage 45 of each block 31 may define a portion of the gaseous fuel common rail 22. Likewise, the liquid rail passage 42 of each block 31 may define a segment of the liquid fuel common rail 21 as best shown in FIGS. 1 and 2.

Referring more specifically to FIG. 4, reliable sealing contact between the co-axial quill assembly 30 and fuel injector 25 against leakage of both gaseous and liquid fuels may be accomplished by tightening only a single fastener 80 to a predetermined torque load. This may be accomplished by locating the gage line at the second end 62 of the inner tube 32 to extend a predetermined target distance $\Delta$ beyond the gage line at the second end 67 of the outer tube 33. The gage line is the sealing contact line. A predetermined load may be placed on block 31 by load adjusting clamp 34 acting along axis 29 so that the outer and inner tubes 33, 32 seat on common conical seat 27 at their respective gage lines. Tightly controlling the predetermined target distance Δ may be accomplished in a number of ways. In the illustrated embodiment, target distance Δ is held to a tolerance d that is a stack up of tolerance e, β and α. Dimension distance E+/−tolerance corresponds to the distance between the gage line of conical seat 53 and the shoulder face against which o-ring 73 seals of block 31. Dimension distance B+/−tolerance β corresponds to the distance from the shoulder surface of outer tube 33 to the gage line at second end 67 of outer tube 33. Dimension distance A+/−tolerance α corresponds to the distance between the gage lines at opposite ends of inner tube 32. Provided that the distances A, B and E can be held within reasonable tolerances, the tolerance stack up d on target distance Δ can be made acceptable such that proper sealing at conical seat 27 of fuel injector 25 is reliably made. Tolerance stack up d equals e plus β and α. During preassembly, the predetermined target distance D may be set within an acceptable tolerance e by selecting a block 31 with an appropriate dimension distance E+/−e, an outer tube 33 with an appropriate dimension distance B+/−β, and a inner tube 32 with an appropriate dimension distance A+/−α. Provided that the tolerance stack up of e+B+A yields an acceptable tolerance D, a simple nearly fool proof installation may be assured by simply tightening a single fastener 80 to an appropriate torque load to apply an appropriate load along centerline 29.

In order to trap debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the liquid fuel conduit 44 defined by inner tube 32. The gaseous fuel edge filter 36 is shown positioned within outer tube 33 between the two step wise diameter reductions 70. In the illustrated embodiment, gaseous fuel edge filer 36 may have a combined dual purpose by including a retainer 38 that can be thought of as in contact with the inner surface 69 of outer tube 33 and of the outer surface 63 of inner tube 32. In this embodiment, retainer 38 may include an o-ring that encourages gaseous fuel traveling along gaseous fuel conduit 47 to move between edge filter 36 and outer tube 33 to trap debris upstream from fuel injector 25.

Because inner tube 32 is unattached to either outer tube 33 or block 31, co-axial quill assembly 30 may include the retainer 38 that is in contact with the outer surface 63 to maintain the inner tube 32 with the block 31 and outer tube 33 during pre-installation handling. In other words, retainer 38 may inhibit inner tube 32 from falling out of outer tube 33 during pre-installation handling. The edge filter 36/retainer 38 of the disclosure allows the co-axial quill assemblies 30 to be preassembled with a precisely predetermined target distance Δ so that installation is made easy and simple without the need for custom adjustments at each co-axial quill assembly 30. In the illustrated embodiment, consistent leak free installation may only require torqueing fastener 80 to a predetermined load, without any other considerations.

Figure 5:
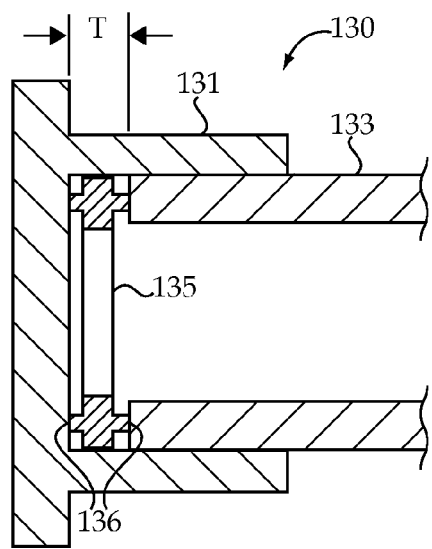
FIG. 5 is a partial sectioned side view through a co-axial quill assembly according to another aspect of the present disclosure.
Figure 6:
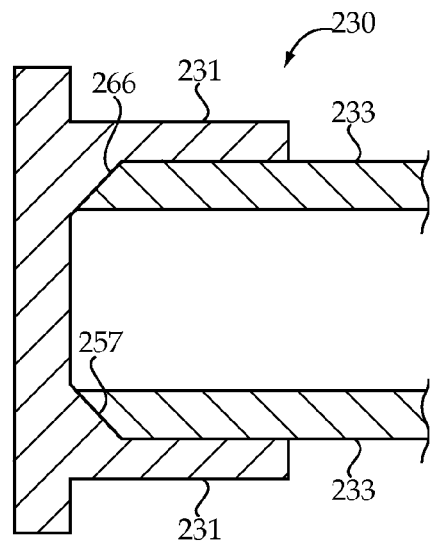
FIG. 6 is a partial sectioned side view through a co-axial quill assembly according to still another aspect of the present disclosure.

Referring now in addition to FIGS. 5 and 6, two additional embodiments of the co-axial quill assembly are shown in which different sealing strategies are utilized to prevent gaseous fuel leakage from between the block and the outer tube. In particular, FIG. 5 shows a portion of a co-axial quill assembly 130 in which a shim 135 has elevated annular sealing lands 136 on opposite sides that bear against block 31 and one end of outer tube 133 when the co-axial quill assembly 130 is installed in engine 10 with load adjusting clamp 34 discussed earlier. Thus, in this embodiment the annular seal that prevents leakage of gaseous fuel from between block 131 and outer tube 133 occurs at elevated sealing lands 136. In addition, this embodiment may utilize a category part shim 135 with variable thicknesses T that helps to set the predetermined target distance Δ for proper sealing of the second ends of the inner and outer tubes in the common conical seat 27 of fuel injector 25 (FIG. 4). FIG. 6 shows still another alternative in which the annular seal that prevents gaseous fuel from leaking between block 231 and outer tube 233 is accomplished by loading the tapered end 266 of outer tube 233 against a tapered seat 257 formed in block 231. In either of the alternative co-axial quill assemblies 130 or 230, additional sealing or alternative sealing may be accomplished by an annular weld or braze, if desired, between outer tube 133 and block 131.

INDUSTRIAL APPLICABILITY

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure finds specific application where locating a pressure damping chamber in a co-axial quill assembly 30 can assist in reducing variations in gaseous fuel injections among a plurality of fuel injectors 25.

Referring back to all of the FIGS. 1-4, a method of operating dual fuel engine 10 begins by assembling a dual fuel common rail system 20 to an engine housing 11. Gaseous fuel is supplied from the gaseous fuel common rail 22 to each of the plurality of fuel injectors 25 for a respective co-axial quill assembly 30. Likewise, liquid fuel from a liquid fuel common rail 21 is supplied to each of the plurality of fuel injectors 25 by the same respective co-axial quill assemblies 30. When in operation, gaseous fuel is injected from each fuel injector 25 into an engine cylinder 12 responsive to a gaseous fuel injection signal communicated from electronic engine controller 15 to the fuel injector 25. Also, liquid fuel from the fuel injector 25 is injected directly into engine cylinder 12 from the same fuel injector 25 responsive to a liquid fuel injection signal from electronic engine controller 15. Variations in gas fuel injection quantities among the plurality of fuel injectors 25 are reduced by damping pressure waves arriving from the gaseous fuel common rail 22 with a pressure damping chamber 48 defined by each respective co-axial quill assembly 30. During gaseous fuel injections, gaseous fuel arrives in quill chamber 52 from gaseous fuel passage 46. The gaseous fuel then flows in grooves of edge filter 36 with debris being trapped between the outer surface of edge filter 36 and the inner surface 69 of outer tube 33. This flow pattern may be encouraged by having mating geometry that encourages the sealing contact between retainer 38 and the various other components including inner tube 32, edge filter 36 and block 31. During the pre-assembly of each co-axial quill assembly 30, the predetermined target distance Δ is set as discussed earlier. One of the discussed strategies (e.g. o-ring, elevated seal lands, cone on cone or annular weld) may be utilized for sealing against leakage of gaseous fuel from between the outer tube 33 and the block 31.

During installation, the inner tube 32 may be clamped between the conical seat 53 of block 31 and the common conical seat 27 of the respective fuel injector 25. By utilizing blocks 31 for each co-axial quill assembly and by orienting them appropriately as described, dual fuel common rail system 20 facilitates construction of gaseous fuel common rail 22 and the liquid fuel common rail 21 by daisy chaining a plurality of co-axial quill assemblies 30 together utilizing identical gaseous fuel line segments 18, liquid fuel line segments 19 and associated fittings received in respective gaseous rail passages 45 and liquid rail passages 42. Both the pre-installation construction and the installation configuration shown serve to maintain the inner tube 32 of each co-axial quill assembly 30 out of contact with the respective outer tube 33.

The present disclosure addresses a previously unrecognized problem associated with undesirable, and maybe unpredictable, variations in gaseous fuel injection rates and quantities due to pressure fluctuations within the fuel injector 25 during gaseous fuel injection events. The present disclosure insightfully recognizes that a small flow area orifice in the liquid fuel supply inhibits the pressure fluctuations in the associated liquid fuel injection variations, whereas an enlarged volume pressure damping chamber 48 serves a similar purpose in reducing pressure fluctuations during gaseous fuel injection events within the respective fuel injectors 25.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A coaxial quill assembly for a dual fuel common rail fuel system comprising:
    a block defining a liquid fuel passage that opens into a quill chamber through a conical seat, and defines a gaseous fuel passage that opens into the quill chamber outside of the conical seat;
    an inner tube that defines a liquid fuel conduit extending between a first end and a second end, and the first end including an annular spherical surface resting in contact with, but unattached to, the conical seat;
    an outer tube with a hollow interior separating a first end from a second end, and the first end being received in the quill chamber;
    a gaseous fuel conduit extending between an outer surface of the inner tube and an inner surface of the outer tube;
    an annular seal for preventing gaseous fuel from escaping from the gaseous fuel conduit between the block and the outer tube;
    an upstream half of the gaseous fuel conduit having a pressure damping chamber with a volume larger than a volume of a downstream half of the gaseous fuel conduit to damp pressure waves arriving from the gaseous fuel passage of the block; and
    a gage line at the second end of the inner tube extending a predetermined target distance beyond a gage line at the second end of the outer tube so that the inner and outer tubes seat on a common conical seat responsive to a predetermined load on the block along an axis of the inner tube.

2. The coaxial quill assembly of claim 1 wherein the annular seal includes an O-ring trapped between the outer tube and the block.

3. The coaxial quill assembly of claim 1 including at least one retainer in contact with an outer surface of the inner tube for maintaining the inner tube with the block and the outer tube during pre-installation handling.

4. The coaxial quill assembly of claim 1 wherein the block defines a gaseous rail passage that is oriented perpendicular to the axis and fluidly connected to the gaseous fuel passage; and
    the block defines a liquid rail passage that is oriented perpendicular to the axis and fluidly connected to the liquid fuel passage.

5. The coaxial quill assembly of claim 1 including a load adjusting clamp with a pivot surface in contact with the block at a load contact location intersected by the axis; and
    the load adjusting clamp defines a fastener bore and a fastener slot.

6. The coaxial quill assembly of claim 1 wherein the outer surface and the inner surface of the outer tube include two stepwise diameter reductions along the axis in a direction of the second end.

7. The coaxial quill assembly of claim 6 wherein the annular seal includes an O-ring trapped between the outer tube and the block
    an edge filter/retainer in contact with an outer surface of the inner tube and the inner surface of the outer tube for blocking debris and for maintaining the inner tube with the block and the outer tube during pre-installation handling;
    wherein the block defines a gaseous rail passage that is oriented perpendicular to the axis and fluidly connected to the gaseous fuel passage, and the block defines a liquid rail passage that is oriented perpendicular to the axis and fluidly connected to the liquid fuel passage;
    a load adjusting clamp with a pivot surface in contact with the block at a load contact location intersected by the axis; and
    the load adjusting clamp defines a fastener bore and a fastener slot.

* * * * *